April 29, 1930.  B. E. HOUSE  1,756,827
BRAKE
Filed Aug. 2, 1924
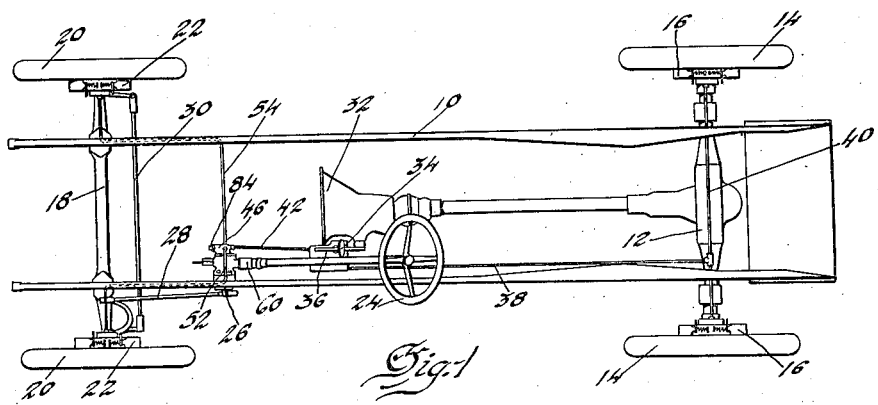
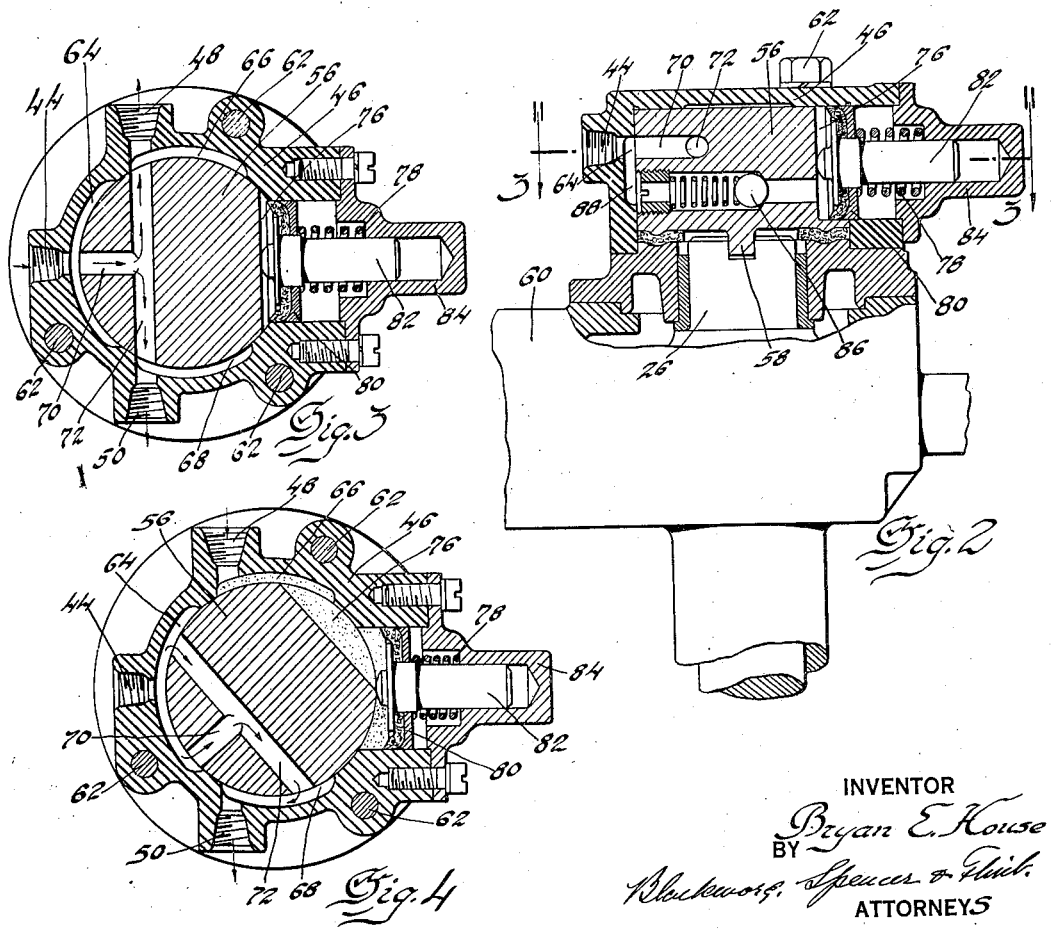
INVENTOR
Bryan E. House
BY
Blackmore, Spencer & Nick
ATTORNEYS Patented Apr. 29, 1930

1,756,827

UNITED STATES PATENT OFFICE

BRYAN E. HOUSE, OF FLINT, MICHIGAN, ASSIGNOR TO GENERAL MOTORS CORPORATION, OF DETROIT, MICHIGAN, A CORPORATION OF DELAWARE

BRAKE

Application filed August 2, 1924. Serial No. 729,801.

This invention relates to fluid-pressure-operated brakes, and is illustrated as embodied in an automobile chassis having such brakes on its dirigible road wheels, with a novel control valve operated by the steering assembly to vary the braking pressure when the dirigible wheels are turned, as for example by relieving the pressure on the brake on the outer side of the turn to guard against skidding.

One object of the invention is to simplify the connections by arranging the control valve or its equivalent for direct operation by the steering assembly, as by keying or gearing it to the usual cross-shaft at the bottom of the steering column. Another object is to simplify the valve by embodying most of the necessary elements in a single rotatable member which is very easily operated and which is not itself affected by the pressure on the brakes.

These and other objects of the invention will be apparent from the following description of one illustrative embodiment shown in the accompanying drawings, in which:

Figure 1 is a diagrammatic top plan view of part of an automobile chassis showing the brake-operating connections;

Figure 2 is a bottom view of the lower end of the steering assembly, broken away to show the control valve in section in a generally horizontal plane;

Figure 3 is a vertical section, on the line 3—3 of Figure 2, through the control valve; and Figure 4 is a view corresponding to Figure 3, but showing the parts of the valve in the positions they assume when the automobile is rounding a corner.

In the arrangement selected for illustration, the chassis includes a frame 10 supported by the usual springs on a rear axle 12 having road wheels 14 with fluid-pressure-operated brakes 16, and on a front axle 18 having dirigible road wheels 20 with fluid-pressure-operated brakes 22. The wheels 20 are controlled by a steering assembly comprising a wheel 24 operating a steering column geared to a cross shaft 26 having a steering arm connected to the front wheels by a drag link 28. The front wheels are connected by a cross tie rod 30. The rear wheels are driven by mechanism including a transmission 32.

Pressure is applied to the brakes by a pedal 34 operating a piston in a master cylinder 36 connected to the rear brakes by conduits 38 and 40. Cylinder 36 is connected by an inlet conduit 42 to an inlet port 44 of the casing 46 of a novel control valve having two outlet ports 48 and 50 communicating with outlet conduits 52 and 54 leading to the front brakes.

Except as further described below, the above-identified parts may be of any desired construction, and are therefore not described in detail.

The novel control valve including the casing 46 is of such construction that it may be operated by any of the parts which move in turning wheels 20 to round a corner, but according to one feature of the present invention it is directly operated by the steering assembly, as by being keyed or geared to the cross-shaft 26. In the arrangement illustrated, it includes a rotatable member such as a cylinder 56 having a key 58 seated in a slot in the end of shaft 26 opposite the end carrying the steering arm. Casing 46 is secured to the steering column casing 60 by bolts or screws 62, over the end of shaft 26.

Inlet port 44 expands, on the inside of casing 46, into a circumferential groove 64 extending in both directions for a total of some 90°. Outlet ports 48 and 50 expand respectively into circumferential grooves 66 and 68, each of which grooves, however, extends only in one direction,—i. e. clockwise for groove 66 (Figure 3) and counterclockwise for groove 68. Member 56 has an inlet conduit 70 which is at all times in communication with groove 64, and therefore with conduit 42, and which opens into alined outlet conduits constituting a cross bore 72. Bore 72 communicates at its opposite ends with grooves 66 and 68 when the member 56 is in its central or neutral position, with the automobile moving straight ahead. When wheel 24 is operated to round a corner, however, one end of bore 72 is turned out of registry with its groove 66 or 68, the upper end being turned out of registry with groove 66 in Figure 4. In the particular arrangement shown, the end of bore 72 which is thus cut off from its brake is swung into registry with groove 64, so that fluid under pressure from groove 64 enters bore 72 directly as well as through the inlet conduit 70. The opposite end of bore 72 remains in registry with its groove (groove 68 in Figure 4) to maintain the pressure on the brake 22 for the wheel 20 which is on the inside of the turn.

At the same time that bore 72 passes out of registry with groove 66 in turning to the position of Figure 4, groove 66 comes into communication with a chamber 76 in the back of member 56, thus relieving the pressure on the brake on the outside of the turn to prevent any possibility of losing steering control by locking both front wheels on the turn. Chamber 76 is formed by cutting off the back of cylindrical member 56, on a chordal plane, to form a flat surface defining, with casing 46, the desired relief chamber. Further to relieve the pressure, member 56 in turning cams back, against the resistance of a light spring 78, a piston 80 carried by a plunger 82 sliding in a cylinder formed in a separable cap 84 forming part of casing 46. When the brakes are released, fluid in chamber 76 is forced by piston 80 back through a ball check valve 86 into a groove 88 communicating with groove 64 and therefore with inlet conduit 42.

While one embodiment of the invention has been described in detail, it is not the intention to limit its scope to that particular embodiment, or otherwise than by the terms of the appended claims.

I claim:

1. In vehicle steering mechanism of the class described and in combination with a casing having a cross shaft operatively connected with the front wheels of the vehicle, and a steering wheel shaft for operating said cross shaft; a valve casing secured to said first mentioned casing and having an inlet port, and two outlet ports located one upon either side of said inlet port; an oscillating valve member operated by said cross shaft and having an inlet port adapted to communicate with the inlet port of said valve casing, and two outlet ports adapted to communicate with the outlet ports of said casing; a cylinder associated with said valve casing and with the interior of which either of the outlet ports of said valve casing may communicate when said valve member is moved into its extreme positions; a spring-pressed piston operating in said cylinder; a conduit leading from said cylinder to the inlet port of said valve casing; and a check valve in said conduit and which opens toward said inlet port.

2. In vehicle steering mechanism of the class described and in combination with a casing having a cross shaft operatively connected with the front wheels of the vehicle, and a steering wheel shaft for operating said cross shaft; a valve casing secured to said first mentioned casing and having an inlet port, and two outlet ports located one upon either side of said inlet port; an oscillating valve member engaged by one end of said cross shaft, and which valve member has an inlet port adapted to communicate with the inlet port of said valve casing, and two outlet ports adapted to communicate with the outlet ports of said casing; a cylinder associated with said valve casing and with the interior of which either of the outlet ports of said valve casing may communicate when said valve member is moved into its extreme positions; a spring-pressed piston operating in said cylinder; a conduit leading from said cylinder through said valve member and to the inlet port of said valve casing; and a check valve in said conduit and which opens toward said inlet port.

3. The combination with a pair of steering wheels, of a fluid pressure operated brake unit for each of said wheels, a source of fluid under pressure, a steering wheel control device comprising a casing forming a chamber, said casing having a pair of ports, conduits between said ports and said brake units respectively, a member movable in said chamber and provided with conduits normally communicating with said ports respectively, means for moving said member with said steering wheels, a supply pipe for conducting said fluid from said source to the last said conduits, and means effective upon a predetermined steering movement for placing one of said ports in communication with said chamber whereby the fluid pressure in one of said first mentioned conduits is relieved.

4. A vehicle having, in combination, dirigible front wheels having fluid-pressure-operated brakes, a steering column casing, an oscillating cross-shaft supported in a bearing formed in said casing and which shaft is operatively connected with said wheels to turn them to steer the vehicle, means for operating said shaft, a control valve casing secured to said first mentioned casing and having an inlet port, and two outlet ports, conduits leading from said outlet ports to the brakes aforesaid, and a control valve arranged within said control valve casing and operated by said cross-shaft for controlling said outlet ports.

5. A vehicle having, in combination, dirigible front wheels having fluid-pressure-operated brakes, a steering column casing, an oscillating cross-shaft supported in a bearing formed in said casing and which shaft is operatively connected with said wheels to turn them to steer the vehicle, means for operating said shaft, a control valve casing secured to said first mentioned casing and having an inlet port, and two outlet ports arranged one upon either side of said inlet port, conduits leading from said outlet ports to said brakes, and an oscillating control valve arranged inside said control valve casing and to which valve said cross-shaft is directly connected.

6. A vehicle having, in combination, dirigible front wheels having fluid-pressure-operated brakes, a steering column casing, an oscillating cross-shaft supported in a bearing formed in said casing and which shaft is operatively connected with said wheels to turn them to steer the vehicle, means for operating said shaft, a control valve casing secured to said first mentioned casing and having an inlet port, and two outlet ports, conduits leading from said outlet ports to the brakes aforesaid, a control valve arranged within said control valve casing and operated by said cross-shaft for controlling said outlet ports, and means for relieving the pressure of the fluid in said conduits upon predetermined steering movements of said front wheels.

In testimony whereof I affix my signature.

BRYAN E. HOUSE.